United States Patent [19]

Sugiura et al.

[11] Patent Number: 4,922,175
[45] Date of Patent: May 1, 1990

[54] POSITION/SPEED DETECTION METHOD AND APPARATUS

[75] Inventors: Yasuyuki Sugiura, Takahagi; Mitsuru Watabe, Katsuta; Shigeki Morinaga; Kunio Miyashita, both of Hitachi; Hiroshi Sugai, Sakura, all of Japan

[73] Assignee: Hitachi, Ltd., Tokyo, Japan

[21] Appl. No.: 318,688

[22] Filed: Mar. 3, 1989

[51] Int. Cl.$^5$ .................................................. G05B 1/02
[52] U.S. Cl. ...................................... 318/592; 318/594; 318/603; 318/618
[58] Field of Search ................................. 318/562–685

[56] References Cited

U.S. PATENT DOCUMENTS

| | | | |
|---|---|---|---|
| 3,462,663 | 8/1969 | Schiller | 318/606 |
| 3,725,760 | 4/1973 | Bailey | 318/653 X |
| 4,272,818 | 6/1981 | McDaniel | 318/608 X |
| 4,319,172 | 3/1982 | Sieradzki | 318/618 X |
| 4,429,267 | 1/1984 | Veale | 318/603 X |
| 4,458,322 | 7/1984 | Veale | 318/632 X |
| 4,472,669 | 9/1984 | Denham et al. | 318/661 |
| 4,491,776 | 1/1985 | Veale | 318/618 X |
| 4,494,060 | 1/1985 | Chitayat et al. | 318/618 X |
| 4,529,039 | 7/1985 | Sakundiak | 318/624 X |
| 4,621,224 | 11/1986 | Watabe et al. | 318/594 |

Primary Examiner—William M. Shoop, Jr.
Assistant Examiner—Paul Ip
Attorney, Agent, or Firm—Antonelli, Terry & Wands

[57] ABSTRACT

Disclosed is a position detecting method and apparatus which are suitable for detecting the position of a moving body on the basis of the output of a position detector for generating two-phase periodic waves having a phase difference of a quarter period, the method comprising the steps of: comparing either one of the two-phase periodic waves with a predetermined reference value having hysteresis to thereby obtain a roughly estimated position for every half period of the one periodic wave; analog-to-digital converting the two-phase periodic waves and a zero-cross value for every sampling period to thereby obtain a finely estimated position; and detecting the position of the moving body on the basis of the roughly estimated position and the finely estimated position while correcting an error due to the hysteresis at the starting point of the roughly estimated position, by use of the relationship between the roughly estimated position and the finely estimated position. According to this method/apparatus, continuity between the roughly estimated position and the finely estimated position can be maintained, so that exact and high-resolution position detection can be performed.

5 Claims, 9 Drawing Sheets

CORRECTION JUDGEMENT

| BIT OF $T_6$ | BIT 1 | BIT 0 |
|---|---|---|
| | POSITIVE / NEGATIVE JUDGEMENT BIT | CORRECTION JUDGEMENT BIT |
| | 0: POSITIVE CORRECTION<br>1: NEGATIVE CORRECTION | 0: CORRECTED<br>1: NOT-CORRECTED |

FIG. 9

| VALUE OF $T_6$ | 0 | 1 | 2 | 3 |
|---|---|---|---|---|
| VALUE OF $T_7$ | 0 | 1 | 0 | -1 |

POSITION/SPEED DETECTION METHOD AND APPARATUS

BACKGROUND OF THE INVENTION

1. Field of the Invention

The present invention relates to a method of detecting position/speed of a moving body and apparatus therefor.

Here, although the "moving body" is represented by rotary motors, linearly moving actuators, and so on, those matters similar to the rotary motors, the linearly moving actuators, and so on are also included in the concept of the "moving body". In a wide meaning, the matters similar to these include forward and backward moving tables and turntables in machining tools, arms and turning elements of robots, and the like.

2. Description of the Prior Art

As the means for detecting the position and speed of a moving body, we have proposed those disclosed in the specification and drawings of U.S. Pat. No. 4,621,224.

In the means proposed in the U.S. Pat. No. 4,621,224, the position of a moving body is detected on the basis of an output signal of a two-phase encoder which is arranged to detect relative positions of a moving body and another body which is positioned in a stationary state relative to the moving body, that is to say, two bodies which move relative to each other.

Specifically, the values of two-phase periodic or rectangular waves which serve as predetermined carrier waves are compared with a specific value such as a zero voltage, so that pulse signals are generated at the zero-cross points of the waves. The pulse signals are stored in a storage circuit. The finely estimated position between the pulse signals is detected from the analog values of the periodic waves.

According to the U.S. Pat. No. 4,621,224, the detection of a position between the pulse signals is carried out by interpolation control or by prediction control by an observer. Accordingly, it is difficult to detect an absolute position. In short, each pulse for detecting a roughly estimated position is generated at the zero-cross point of the periodic wave, but the position of generation of the pulse varies widely because of the chattering of the pulse when noise is superimposed on the periodic wave as an analog signal. As a measure counter to the trouble, known is a technique in which hysteresis is given to the specific value to form two reference values (thresholds) to thereby prevent operation error caused by noise.

If hysteresis is given to the specific value, however, the position of generation of the pulse for detecting the roughly estimated position does not always agree with the finely estimated position. Consequently, the position, especially the finely estimated position detected, becomes discontinuous.

SUMMARY OF THE INVENTION

An object of the present invention is therefore to provide a method in which a finely estimated position can be detected exactly without occurrence of discontinuity in detection of the finely estimated position though hysteresis is given to a reference value to improve noise resistance, and an apparatus which is suitable for realizing this method.

According to an aspect of the present invention, the position detecting method comprises the steps of: comparing either one of the two-phase periodic waves with a predetermined reference value having hysteresis to thereby obtain a roughly estimated position for every half period of the one periodic wave; analog-to-digital converting the two-phase periodic waves and a zero-cross value for every sampling period to thereby obtain a finely estimated position; and detecting the position of the moving body on the basis of the roughly estimated position and the finely estimated position while correcting an error due to the hysteresis at the starting point of the roughly estimated position, by use of the relationship between the roughly estimated position and the finely estimated position.

According to another aspect of the present invention, the position detecting apparatus comprises: a moving body; a position detector for generating two-phase periodic waves having a phase difference of a quarter period corresponding to the position of the moving body; a wave-processing circuit for comparing either one of the two-phase periodic waves obtained from the position detector with a predetermined reference value for every half period of the one period wave, and for producing a roughly estimated position output signal upon coincidence between the one periodic wave and the reference value, and for forming two, positive and negative, displacement pulse signals from the two-phase periodic waves for detecting the direction of displacement of the moving body; a U/D counter for counting up/down the two, positive and negative, displacement pulse signals to thereby detect a roughly estimated position of the moving body for every half period of either one of the two-phase periodic waves; a finely estimated position circuit for analog-to-digital converting the two-phase periodic waves and a zero value for every sampling period to thereby detect a finely estimated position; a circumferential absolute position circuit for initializing the U/D counter, for selecting an origin section number and for detecting a circumferential absolute position on the basis of the roughly estimated position and the finely estimated position at an initiation time; a position correcting circuit for correcting the position on the basis of the output of the U/D counter and the circumferential absolute position; a roughly estimated position circuit for correcting errors in the roughly estimated position due to the wave-processing by the wave-processing circuit and due to the displacement pulse counting by the U/D counter, on the basis of the output of the U/D counter and the output of the position correcting circuit; and a position synthesis circuit for synthesizing the output of the roughly estimated position circuit and the output of the finely estimated position circuit to thereby detect the position of the moving body.

The hysteresis acts to prevent the chattering of the displacement pulse signals. On the other hand, the position correcting circuit serves to correct the measurement error of the roughly estimated position caused by the hysteresis. Accordingly, an exact position can be detected.

DESCRIPTION OF THE PREFERRED EMBODIMENTS

Figure 1:
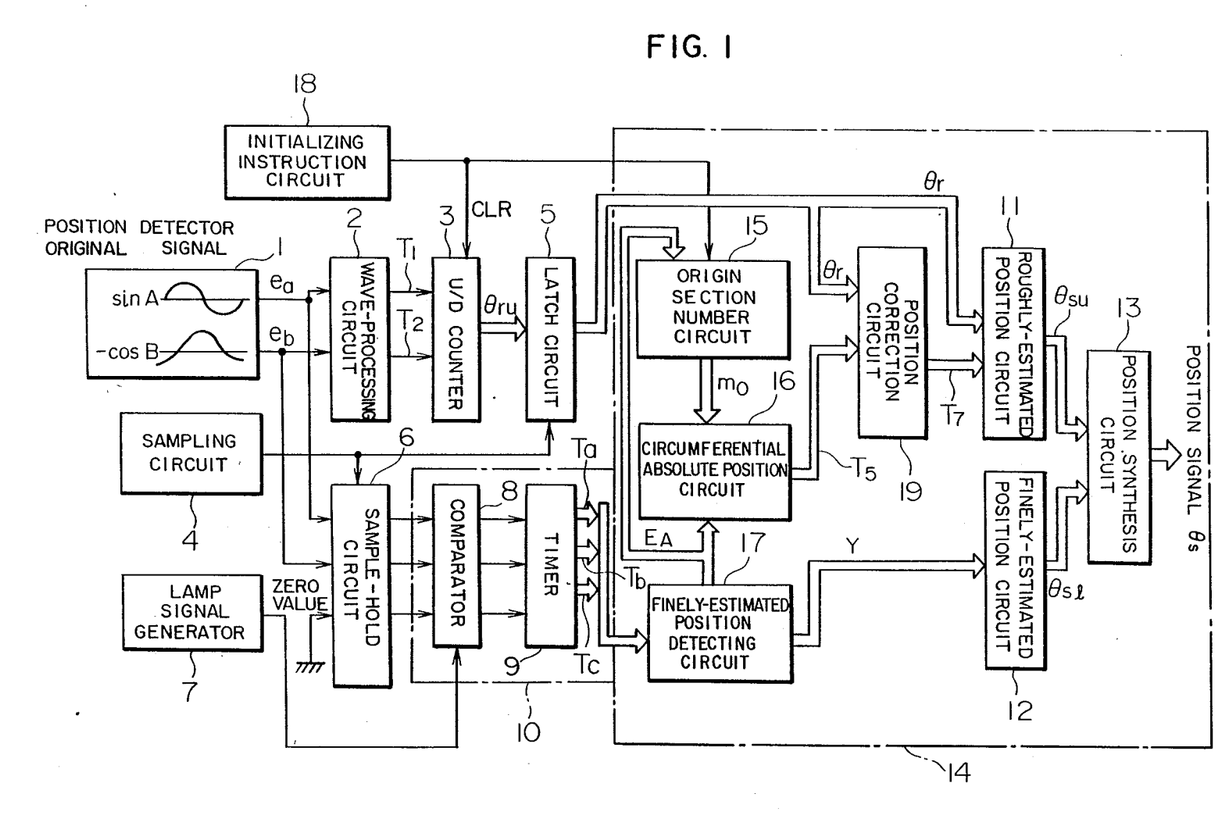
FIG. 1 is a block diagram of a position detecting apparatus as an embodiment of the present invention.
Figure 2:
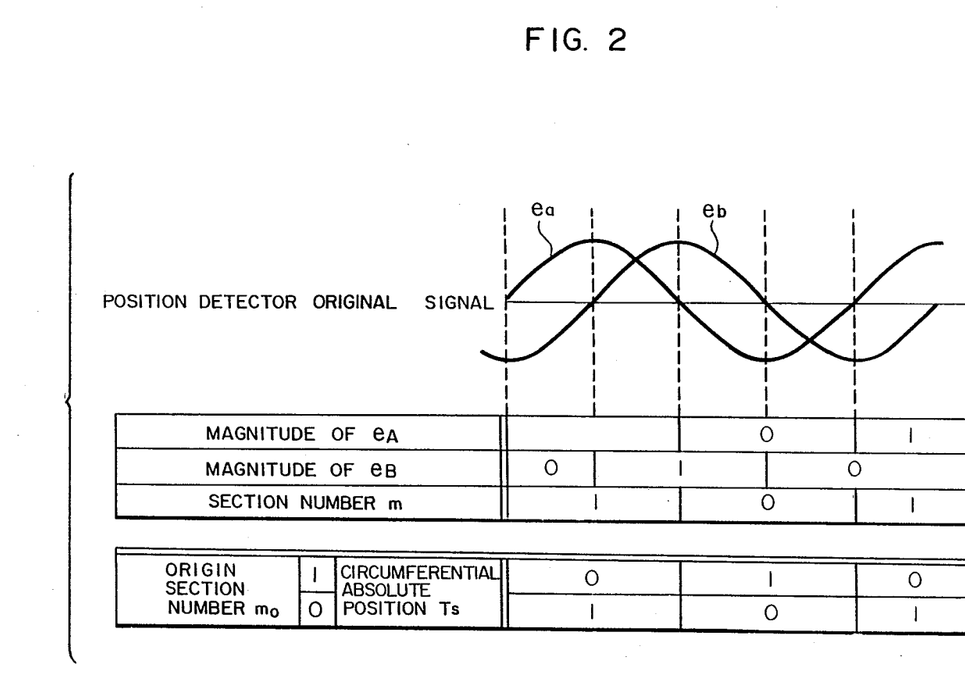
FIG. 2 is a view for explaining the principle of a circumferen absolute position detection method.
Figure 3:
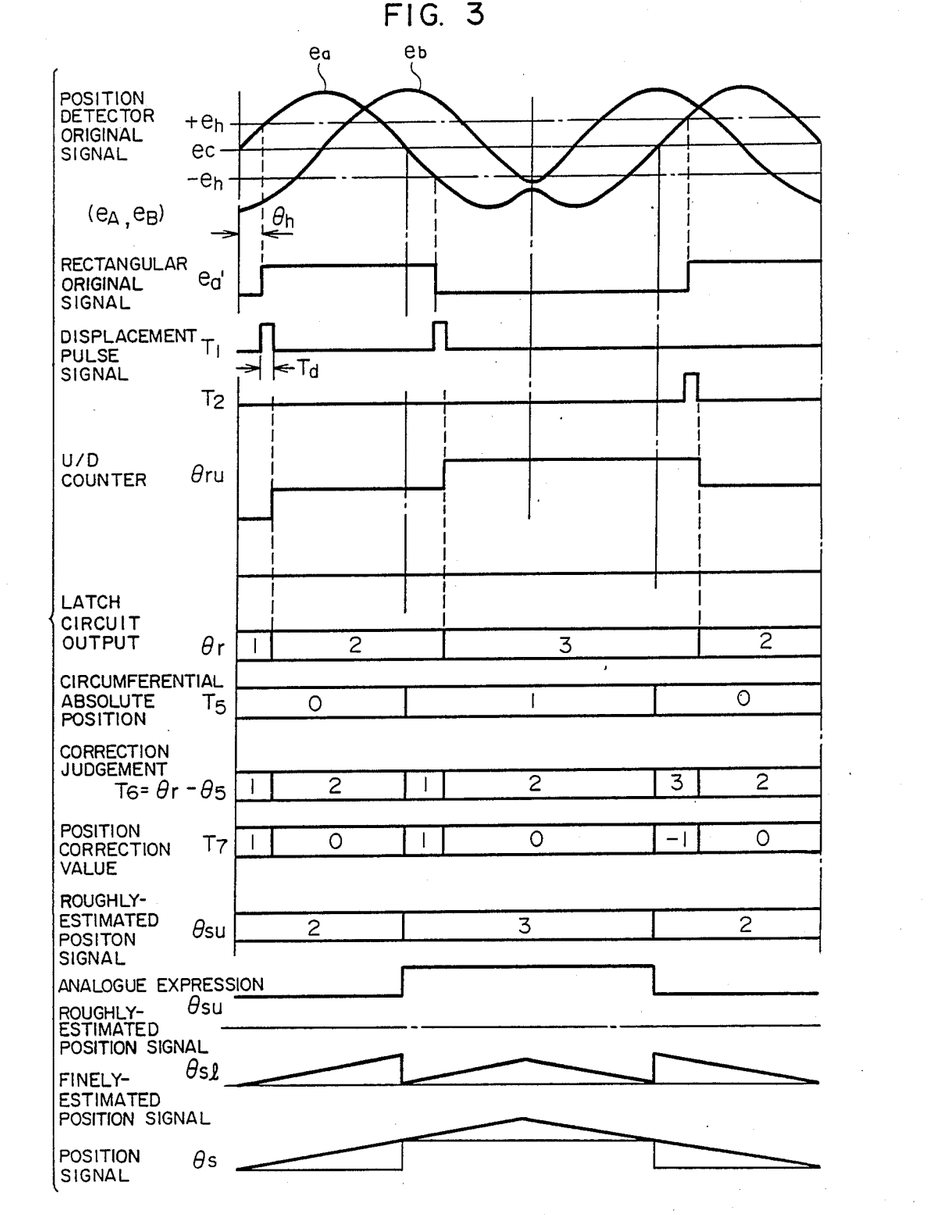
FIG. 3 is a timing chart showing the principle of the position detection method.
Figure 4:
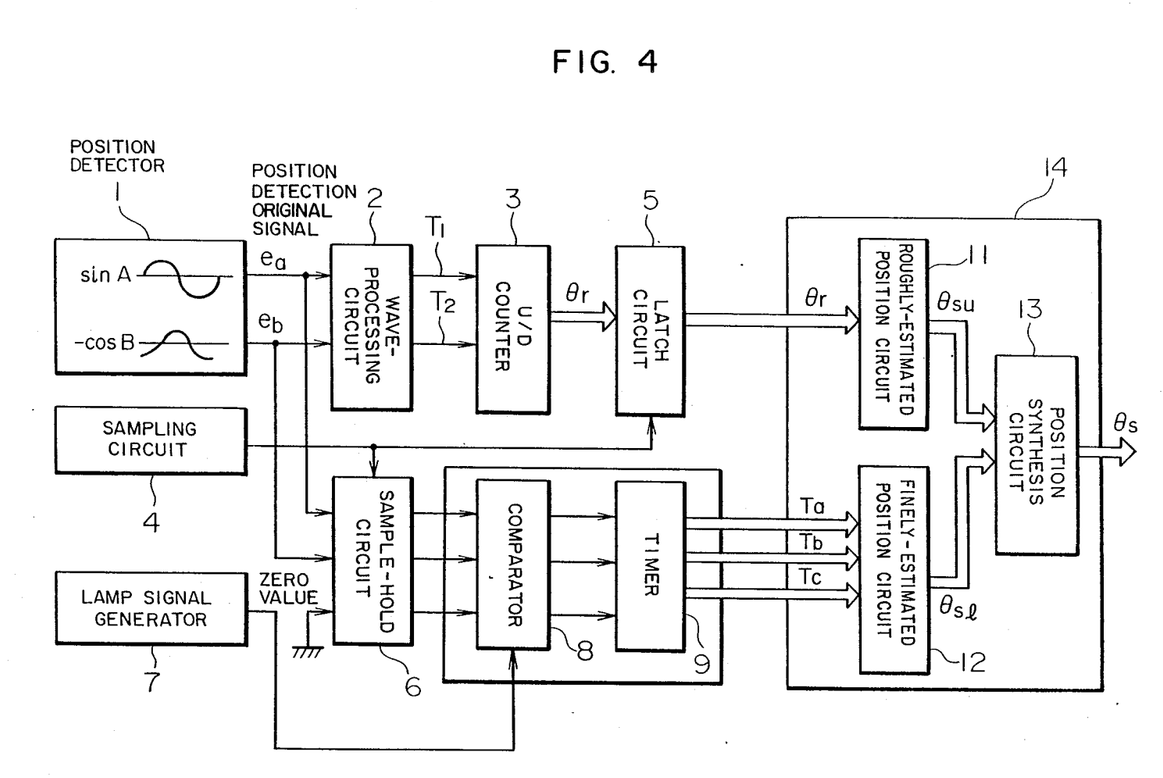
FIG. 4 is a view for explaining the principle of the position detection in which the position is detected from a roughly estimated position and a finely estimated position.
Figure 5:
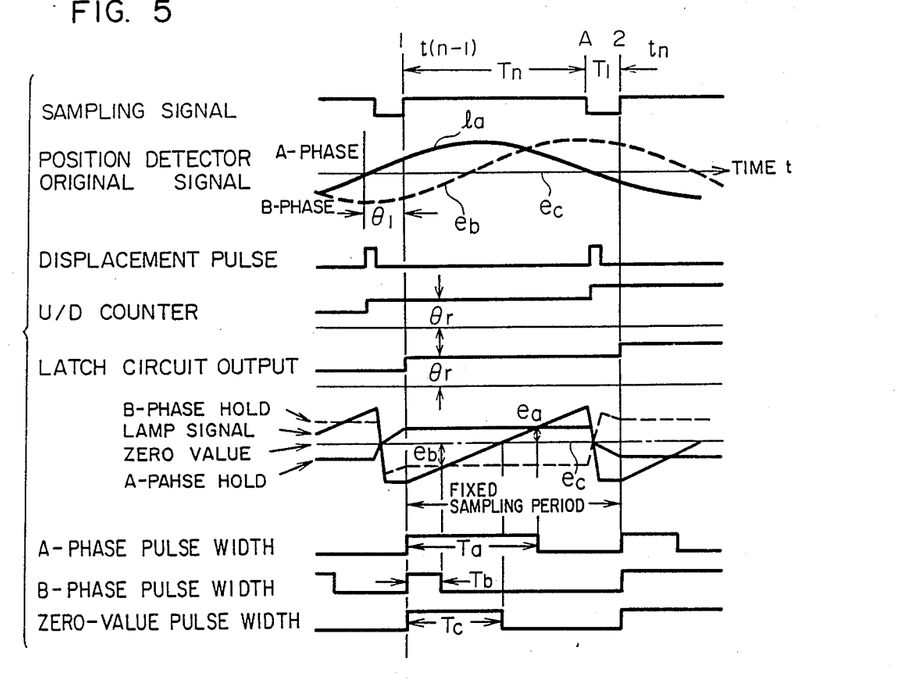
FIG. 5 is a timing chart of the position detection related to the roughly estimated position and the finely estimated position.
Figure 6:
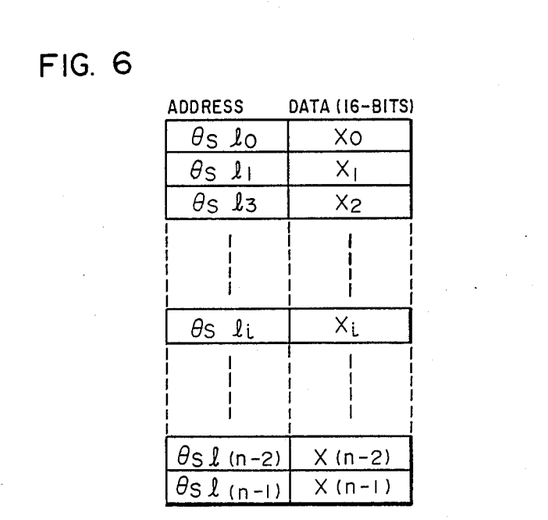
FIG. 6 is a view showing a table of tan $\theta_f$.
Figure 7:
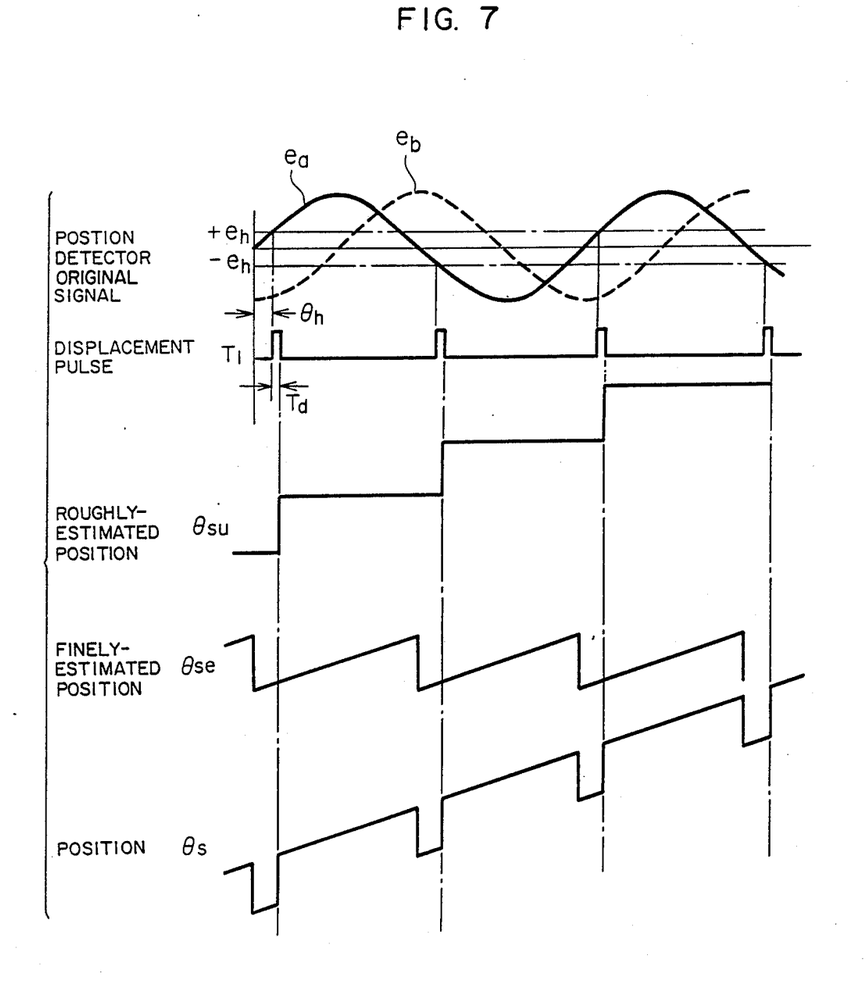
FIG. 7 is a timing chart in the case where position correction is not made when the displacement pulse is delayed.
Figure 8:
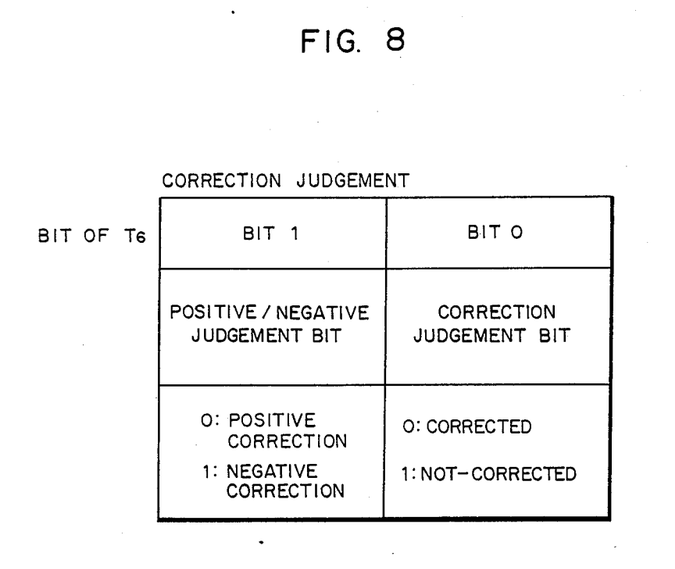
FIG. 8 is a view showing a judgment table for position correction.
Figure 9:
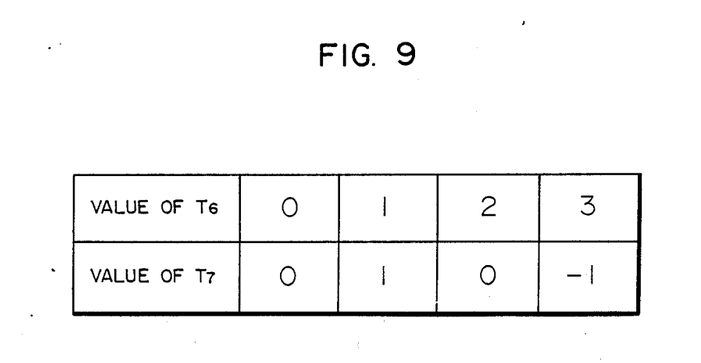
FIG. 9 is a view showing correction values.
Figure 10:
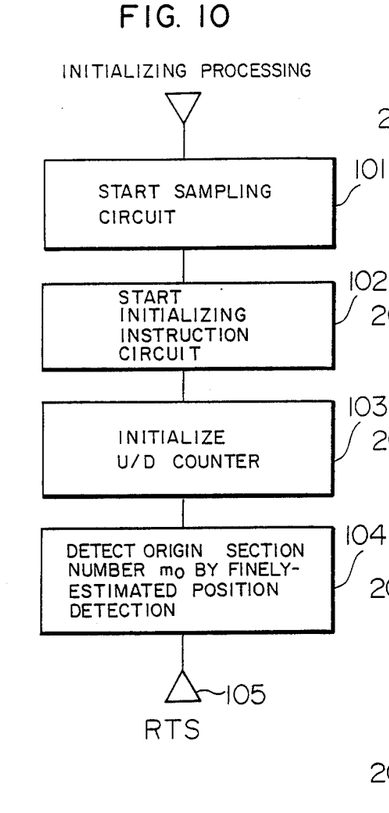
FIGS. 10 and 11 are software flow charts.
Figure 11:
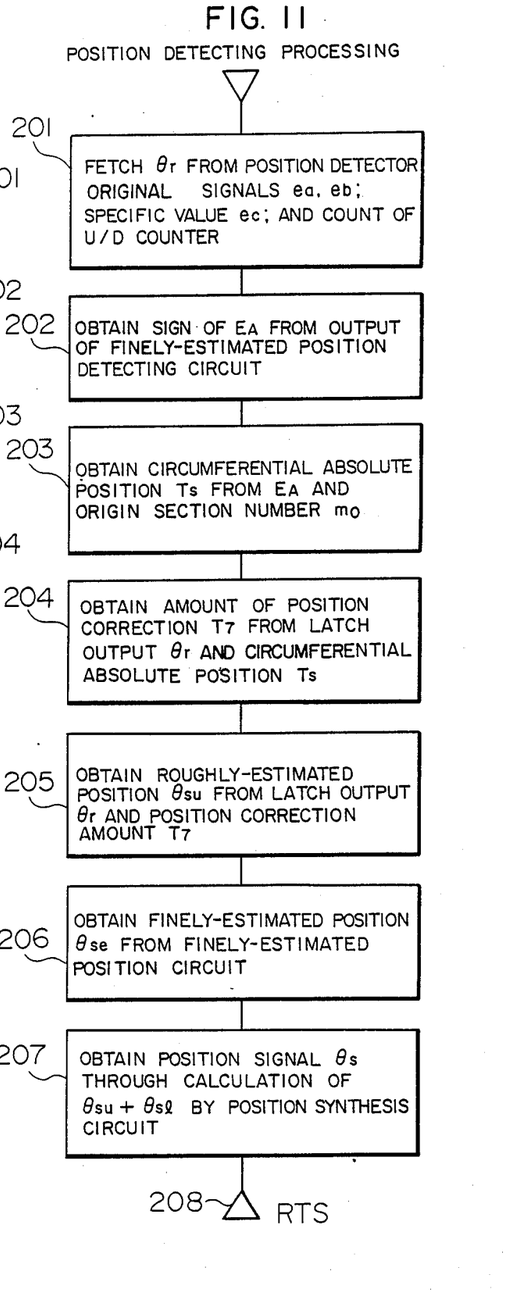

An embodiment of the construction of the present invention will be described hereunder with reference to the drawings in which: FIG. 1 is a block diagram of a position detecting apparatus as an embodiment of the present invention; FIG. 2 is a view for explaining the principle of a circumferential absolute position detection method; FIG. 3 is a timing chart showing the principle of the position detection method; FIG. 4 is a view for explaining the principle of the position detection in which the position is detected from a roughly estimated position and a finely estimated position; FIG. 5 is a timing chart of the position detection related to the roughly estimated position and the finely estimated position; FIG. 6 is a view showing a table of tan $\theta_f$; FIG. 7 is a timing chart in the case where position correction is not made; FIG. 8 is a view showing a judgment table for position correction; FIG. 9 is a view showing correction values; and FIGS. 10 and 11 are software flow charts.

The basic construction of the present invention is shown in FIG. 1. Before the construction of the present invention will be described, the principle of position detection according to the invention is now described with reference to FIGS. 4 through 7.

In FIG. 4, the reference numeral 1 designates a position detector for generating two-phase periodic waves of the same shape in which the phases are different by a quarter period from each other. The reference numeral 2 designates a wave-processing (wave-shaping) circuit for forming a rectangular-wave original signal $e_a{'}$ and displacement pulse signals $T_1$ and $T_2$ by reference to a specific value $e_c$. The reference numeral 3 designates a U/D counter for counting up/down on the basis of the displacement pulse signals $T_1$ and $T_2$. The reference numeral 4 designates a sampling circuit for forming a sampling period. The reference numeral 5 designates a latch circuit for latching the output $\theta_r$ of the U/D counter on the basis of the output of the sampling circuit. The reference numeral 6 designates a sample-hold circuit for holding the output signals (original signals) $e_a$ and $e_b$ of the position detector in synchronization with the output of the sampling circuit. The reference numeral 7 designates a lamp signal generation circuit for generating a lamp signal during a sample-hold period. The reference numeral 8 designates a comparator for comparing samplehold values with the lamp signal to produce an A-phase pulse width, a B-phase pulse width and a zero-value pulse width. The reference numeral 9 designates a timer for measuring the respective pulse widths. The reference numeral 10 designates an A/D converter including the comparator 8 and the time 9. The reference numeral 11 designates a roughly estimated position circuit for multiplying the output of the latch circuit to obtain a roughly estimated position $\theta_{su}$. The reference numeral 12 designates a finely estimated position circuit for calculating than $\theta_i$ from $T_a$, $T_b$ and $T_c$ to obtain a finely estimated position $\theta_{sl}$. The reference numeral 13 designates a position synthesis circuit for adding the finely estimated position $\theta_{sl}$ to the roughly estimated position $\theta_{su}$. FIG. 5 is a timing chart showing the operation of the position detecting apparatus. In FIG. 5, the original signals of the position detector are provided as periodic sine waves with two phases, that is, an A-phase and a B-phase. If the A-phase signal is positive, the wave-processing circuit 2 generates a displacement pulse at an intersection of the A-phase signal and a specific value $e_c$. On the contrary, if the A-phase signal is negative, the wave-processing circuit 2 generates a displacement pulse $T_2$. The U/D counter 3 counts up/down corresponding to the pulse signals $T_1$ and $T_2$. The output $\theta_r$ of the U/D counter 3 is latched by the latch circuit 5 at a point of time $t(n-1)$ of the sampling signal designated by the numeral 1 in FIG. 5. Then, the output $\theta_r$ is converted into a roughly estimated position signal $\theta_{su}$ by the roughly estimated position circuit 11. The roughly estimated position signal is given by the following equation.

$$\theta_{se} = \theta_r \times K_{su} \qquad (1)$$

In the equation (1), $K_{su}$ is a constant.

The sampling signal produces a hold period $T_h$ and a free period $T_f$ as shown in FIG. 5. At the hold starting point ① $t(n-1)$ designated by the numeral 1, the value $\theta$ of the U/D counter is latched by the latch circuit and sent out as the output $\theta_r$ of the latch circuit. On the other hand, the original signals of the position detector are held by the sample-hold circuit 6 at the hold starting point ① $t(n-1)$ in the form of sample values $e_a$, $e_b$ and $e_c$. The sample values $e_a$, $e_b$ and $e_c$ represent the A-phase signal, the B-phase signal and the specific value, respectively.

The lamp signal is generated positively and negatively in the sample-hold period $T_h$. During the sample-hold period $T_h$, the comparator 8 compares the lamp signal with the sample values $e_a$, $e_b$ and $e_c$ to thereby form an A-phase pulse width, a B-phase pulse width and a zero-value pulse width, respectively. The timer 9 measures these pulses widths exactly by reference to the clock pulse signal of a computer to obtain $T_a$, $T_b$ and $T_c$. The comparator 8 and the timer 9 may be replaced by an available A/D converter 10 having the double function of the comparator and the timer. The finely estimated position circuit 12 performs the following operation.

$$E_A = K_2 (T_a - T_c) \qquad (2)$$

$$E_B = K_2 (T_b - T_c) \qquad (3)$$

$$\theta_f = K_1 \tan^{-1} (|E_a|/|E_b|) \qquad (4)$$

In the equation (4), $K_1$ is a constant. The equation (4) is applicable to the region of $E_a \times E_b < 0$.

$$\theta_f = K_1 \tan^{-1}(|E_b|/|E_a|) \quad (5)$$

The equation (5) is applicable to the region of $E_a \times E_b > 0$. As a lot of time is required for the operation of the equations (3) and (4), the equations (3) and (4) are replaced by the following equations.

$$Y = \frac{|E_a| \times K_a}{|E_b|} \quad (E_a \times E_b < 0) \quad (6)$$

In the equation (6), $K_a$ is a constant.

$$Y = \frac{|E_b| \times K_a}{|E_a|} \quad (E_a \times E_b < 0) \quad (7)$$

On the other hand, $\tan \theta_f$ is calculated from the equation (7).

$$X_i = \tan \theta_f \times K_f \quad (8)$$

In the equation (8), $K_f$ is a constant. The data $X_i$ is stored in a table as shown in FIG. 6, so that the address $\theta_{sl}$ in which $X_i$ coincides with Y is used as a finely estimated position. The true position $\theta_s$ is calculated from the roughly estimated position $\theta_{su}$ and the finely estimated position $\theta_{sl}$ by the following equation.

$$\theta_s = \theta_{su} + \theta_{sl} \quad (9)$$

FIG. 7 is a timing chart of position detection. When the displacement pulse $T_1$ is generated on the basis of the original signal $e_a$ of the position detector, the displacement pulse $T_1$ is delayed for the phase $\theta_h$ from the original signal because the displacement pulse $T_1$ is affected by hysteresis $+e_h$, $-e_h$. The displacement point of the roughly estimated position is further delayed for the measurement period $T_d$ from the displacement pulse. The finely estimated position $\theta_{sl}$ is synchronized with the zero point of one phase of the original signal of the position detector. Accordingly, the position $\theta_s$ is discontinuous during the period of $\theta_h + T_d$. It is necessary to detect the discontinuous portion to correct the roughly estimated position $\theta_{su}$.

As described above, the position related to the present invention can be detected.

In the following, the invention is described more in detail mainly with reference to FIG. 1.

Like reference numerals 1 through 14 in each of FIGS. 1 and 4 refer to like parts. In FIG. 1 the reference numeral 15 designates an origin section number circuit for determining the origin section number in the initial state from the sign of the original signal of the position detector 1. The reference numeral 16 designates a circumferential absolute position circuit for determining the circumferential absolute position during the operation from the sign of the original signal of the position detector 1. The reference numeral 17 designates a finely estimated position detecting circuit for obtaining signals $E_A$ and $E_B$ from the output of the timer 9 by use of the equations (2) and (3) and for obtaining a signal Y from the equations (6) and (7). The reference numeral 18 designates an initializing instruction circuit for initializing the U/D counter 3 in the initial state and for determining the state of the origin section number circuit 15.

In FIG. 1, at starting, the original signals $e_a$ and $e_b$ are generated from the position detector 1 which serves to generate two-phase periodic waves different in phase by a quarter period. For example, the position detector 1 may be formed of a rotary encoder connected to a moving body, for example, a rotary body such as a motor or the like. As shown in FIGS. 2 and 3, the wave-processing circuit 2 compares the magnitudes of the two signals by use of a comparator having hysteresis of $\pm e_h$ with respect to the specific value $e_c$, to thereby obtain a rectangular-wave original signal $e_a'$ as shown in FIG. 3. Because of hysteresis, the rectangular-wave original signal $e_a'$ is delayed for $\theta_h$ from the intersection of the specific value $e_c$ and the original signal $e_a$ of the position detector. A displacement pulse $T_1$ or $T_2$ is generated in synchronization with the rising or falling of the rectangular-wave original signal $e_a'$. The generation of the displacement pulse $T_1$ or $T_2$ is related to the direction of displacement of the rotary body. If the rotary body moves in a positive direction, the positive-displacement pulse $T_1$ is generated. If it moves in a negative direction, the negative-displacement pulse $T_2$ is generated. The U/D counter 3 counts up or down corresponding to the displacement pulse $T_1$ or $T_2$. However, the time delay $T_d$ with respect to the displacement pulse is caused by the U/D counter 3. The original signals $e_a$ and $e_b$ of the position detector 1 are held at the point of time ① $t(n-1)$ (Refer to FIG. 5) by the output signal of the sampling circuit. Then the comparator 8 compares the lamp signal generation circuit 7, the sample-hold values $e_a$ and $e_b$ and the specific value $e_c$ to thereby form an A-phase pulse width, a B-phase pulse width and a C-phase pulse width. These pulse widths $T_a$, $T_b$ and $T_c$ are measured by the timer 9. The finely estimated position detecting circuit 17 calculates $E_a$ and $E_b$ with sign by use of the equations (2) and (3). Further, the finely estimated position detecting circuit 17 calculates Y by use of the equations (6) and (7). The finely estimated position circuit 12 calculates the finely estimated position signal $\theta_{sl}$ from $X_i$ and Y in the equation (8). As described above with reference to FIG. 7, the displacement point of the U/D counter $\theta_{ru}$ and the zero point of the finely estimated position circuit signal $\theta_{sl}$ do not coincide with each other. Therefore, the present invention is constructed so that coincidence between the output signal $\theta_r$ of the latch circuit obtained from the output $\theta_{ru}$ of the U/D counter 3 and the zero point of the finely estimated position circuit signal $\theta_{sl}$ can be made by use of the origin section number circuit 15, the circumferential absolute position circuit 16, the finely estimated position detecting circuit 17, the position correcting circuit 19, the roughly estimated position circuit 11, the finely estimated position circuit 12 and the position synthesis circuit 13.

In the following, the method of the present invention is described.

When the rotary body is started or in other words when the position detector 1 is stopping, the initializing instruction circuit 18 performs initialization (clear to zero value) of the U/D counter 3 and initialization of the origin section number circuit 15. Let the origin section number $m_0$ be 1 in the case where the signal $e_a$ is positive at the time of initialization as shown in FIG. 2, while let $m_0$ be 0 in the case where $e_a$ is negative at the time of initialization as shown in FIG. 2. Assuming now that $m_0 = 1$, then the U/D counter 3 is initialized when $e_a$ is positive. When $e_a$ is positive, the output $T_5$ of the circumferential absolute position circuit 16 is expressed by two significant bits "00" in binary notation. When $e_a$ is negative, the output $T_5$ of the circumferential absolute position circuit 16 is expressed by two significant bits "01" in binary notation. On the contrary, assuming that $m_0 = 0$, then the U/D counter 3 is initialized when $e_a$ is negative. When $e_a$ is positive, the output $T_5$ of the circumferential absolute position circuit 16 is expressed by two significant bits "01" in binary notation. When $e_a$ is negative, the output $T_5$ of the circumferential absolute position circuit 16 is expressed by two significant bits "00" in binary notation. The relation between the circumferential absolute signal $T_5$ and the output $m_0$ of the origin section number circuit determined at the time of initialization does not change during the operation. The detection of the sign of $e_a$ is carried out by the sign of the output $E_A$ of the finely estimated signal detecting circuit 17.

In the following, the detecting method during the operation of the rotary body is described.

The output $\theta_{ru}$ of the U/D counter 3 is latched by the latch circuit 5 on the basis of the output signal of the sampling circuit 4, so that the latch circuit 5 sends out $\theta_r$. The phase distribution of $\theta_{ru}$ with respect to the original signal of the position detector is delayed for $\theta_h + T_d$ from the intersection of the signal $e_a$ and the specific value signal $e_c$ as shown in FIG. 3. FIG. 3 shows the case where the output of the origin section number circuit is $m_0 = 1$. The circumferential absolute position circuit 16 judges from the output $E_A$ of the finely estimated position detecting circuit 17 for every sampling period whether the original signal $e_a$ is positive or not. On the other hand, the output $m_0$ of the origin section number circuit is discriminated by the circumferential absolute position circuit 16 to thereby determine the circumferential absolute position $T_5$ as shown in FIG. 2. The position correcting circuit 19 calculates difference $T_6$ from the output $\theta_r$ of the latch circuit 5 and the circumferential absolute position $T_5$ by the use of the following equation. The difference $T_6$ is divided by 2 and remainder is obtained. The position correction value signal $T_7$ is obtained from the remainder.

$$T_6 = \theta_r - T_5 \qquad (10)$$

In the following, the method for detecting the position correction value $T_7$ is described. Because the lower two bits of $T_5$ in binary notation are significant, the lower bits of the difference $T_6$ are significant. FIG. 8 shows a judgment table for correction due to the lower two bits of $T_6$. If the value of the bit 0 of $T_6$ is "0", the bit shows "no correction". If the value of the bit 0 of $T_6$ is "1", the bit shows "correction".

This is a judgment as to whether $T_6$ is divisible by 2 without remainder or not. If the value of the bit 1 of $T_6$ is "0", the bit shows "positive correction". If the value of the bit 1 of $T_6$ is "1", the bit shows "negative correction". FIG. 9 shows the results of the position correction values $T_7$ obtained from the values of the lower two bits of $T_6$. The value of $T_6$ can take 0, 1, 2 or 3 from the two bits of $T_6$, so that the value of $T_7$ takes 0, 1, 0 or $-1$. The roughly estimated position circuit 11 corrects the roughly estimated position from the output $\theta_r$ of the latch circuit and $T_7$.

$$\theta_r = \theta_r + T_7 \qquad (11)$$

The roughly estimated position signal $\theta_{su}$ is formed by substituting $\theta_r$ into the equation (1). The position synthesis circuit 13 forms a position signal $\theta_s$ by use of the equation (9). In FIG. 3, the roughly estimated position signal $\theta_{su}$, finely estimated position signal $\theta_{sl}$ and position signal $\theta_s$ are expressed as analog signals.

In this operation, the portion surrounded by the dot-and-dash line can be replaced by a micro-computer.

In the following, software processing by micro-computer is described. The software processing is mainly classified into initialization procedure and position detection procedure. FIG. 10 shows the initialization procedure. This procedure is started at the hardware starting time or corresponding to the demand for initialization. In FIG. 10 the reference numeral 10 designates a step of starting the sampling circuit 4 to make preparations for the generation and detection of the respective signals. The reference numeral 102 designates a step of giving an initializing instruction. The reference numeral 103 designates a step of initializing the U/D counter. The reference numeral 104 designates a step of detecting the origin section number $m_0$ on the basis of the detection of the finely estimated position. The reference numeral 105 designates a return subroutine for returning the state to the main procedure. FIG. 11 shows the position detection procedure. In FIG. 11 the reference numeral 201 designates a step of fetching $\theta_r$ from the original signals $e_a$, $e_b$ and $e_c$ of the position detector and the output of the U/D counter. The reference numeral 202 designates a step of obtaining the sign of the output $E_A$ of the finely estimated position detecting circuit 17. The reference numeral 203 designates a step of obtaining the circumferential absolute position from the origin section number $m_0$ obtained by the initialization procedure and $E_A$. The reference numeral 204 designates a step of obtaining the position correction value $T_7$ from the output $\theta_r$ of the latch circuit and the circumferential absolute position $T_5$. The reference numeral 205 designates a step of obtaining the roughly estimated position $\theta_{su}$ from the output $\theta_r$ of the latch circuit and the position correction value $T_7$. The reference numeral 206 designates a step of obtaining Y from the finely estimated position detecting circuit 17 by use of the equations (6) and (7) and, accordingly, obtaining $\theta_{sl}$ from the table of tan $\theta_f$ as shown in FIG. 6. The reference numeral 207 designates a step of obtaining the position signal $\theta_s$ by synthesizing the roughly estimated position and the finely estimated position from the equation (9).

Figure 12:
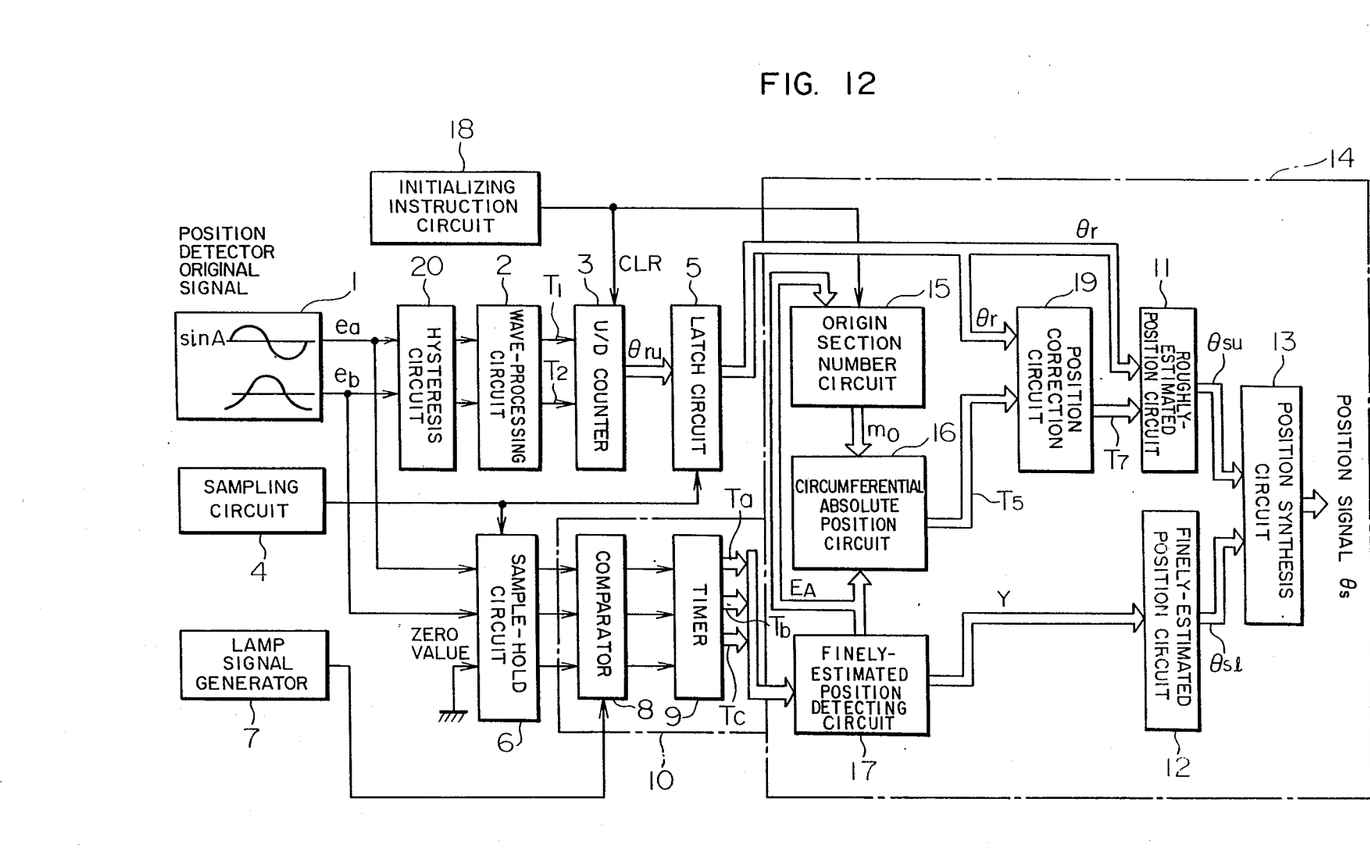
FIG. 12 is a block diagram showing another embodiment.

FIG. 12 shows another embodiment. If the hysteresis voltage $\pm e_h$ applied to the specific value $e_c$ as shown in FIG. 3 is too small when noise or the like is superimposed on the original signal generated from the position detector in the aforementioned apparatus arrangement, chattering and operation error is caused when the two, positive and negative, displacement pulse signals for detecting the direction of displacement of the moving body are formed by the position detector. Therefore, a hysteresis circuit 20 is provided separately in this embodiment. By the hysteresis circuit 20, operation errors can be reduced so that exact detection can be expected.

Although the aforementioned embodiment has shown the case where the roughly or finely estimated position is detected for every half period with respect to one phase of the two-phase periodic waves, the invention is applicable to the case where the roughly or finely estimated position may be detected for every quarter period with respect to two phases of the two-phase periodic waves.

As described above, according to the present invention, the position detecting method using a moving body and a position detector for generating two-phase periodic waves having a phase difference of a quarter period, whereby the position of the moving body is detected on the basis of the two-phase periodic waves generated from the position detector, comprises the steps of: comparing either one of the two-phase periodic waves with a predetermined reference value having hysteresis to thereby obtain a roughly estimated position for every a half period of the one periodic wave; analog-to-digital converting the two-phase periodic waves and a zero-cross value for every sampling period to thereby obtain a finely estimated position; and detecting the position of the moving body on the basis of the roughly estimated position and the finely estimated position while correcting an error due to the hysteresis at the starting point of the roughly estimated position, by use of the relationship between the roughly estimated position and the finely estimated position. To realize the above method, according to the present invention, the apparatus comprises: a circumferential absolute position circuit for initializing the U/D counter, for selecting an origin section number and for detecting a circumferential absolute position on the basis of the roughly estimated position and the finely estimated position at an initiation time; a position correcting circuit for correcting the position on the basis of the output of the U/D counter and the circumferential absolute position; a roughly estimated position circuit for correcting errors in the roughly estimated position due to the wave-processing by the wave-processing circuit and due to the displacement pulse counting by the U/D counter, on the basis of the output of the U/D counter and the output of the position correcting circuit; and a position synthesis circuit for synthesizing the output of the roughly estimated position circuit and the output of the finely estimated position circuit to thereby detect the position of the moving body. Accordingly, the following effects can be attained.

When the position detector for generating the two-phase periodic waves of the same shape, in particular, with the phases being different by a quarter period from each other is used and then the original signals of the position detector are wave-processed or wave-shaped, the chattering in generation of displacement pulses can be prevented by providing hysteresis actively. Accordingly, operation errors can be reduced though noise exists more or less.

On the other hand, measurement errors occur because the time delay in generation of the roughly estimated position signal is caused by the hysteresis. According to the present invention, the continuity between the roughly estimated position and the finely estimated position can be maintained by detecting the measurement errors and by correcting it. In addition, exact and high-resolution position detection can be attained.

As described above, according to the present invention, the relative position and relative speed of a moving body, such as a relatively rotating body or a relatively and linearly moving body, can be measured in high accuracy and high resolution with no error.

The concept "relatively moving (rotating) body" includes a moving body which moves relative to another stationary body, and a moving body which moves relative to another moving body. These moving bodies are in the technical scope of the present invention.

We claim:

1. A position detecting method using a moving body which moves relative to a stationary or moving body, and a position detector for generating two-phase periodic waves having a phase difference smaller than one period in accordance with the relative moving position of said moving body, whereby the position of said moving body is detected on the basis of said two-phase periodic waves generated from said position detector, said method comprising the steps of:

comparing at least one of said two-phase periodic waves with a predetermined reference value having hysteresis to thereby obtain a roughly estimated position for every period which is 1/n (n is integer) as long as the period of said one periodic wave;

analog-to-digital converting said two-phase periodic waves and a zero-cross value for every sampling period to thereby obtain a finely estimated position; and detecting the position of said moving body on the basis of said roughly estimated position and said finely estimated position while correcting an error due to said hysteresis at the zero-cross point of said roughly estimated position, by use of the relationship between said roughly estimated position and said finely estimated position.

2. A position detecting method using a moving body and a position detector for generating two-phase periodic waves having a phase difference of a quarter period, whereby the position of said moving body is detected on the basis of said two-phase periodic waves generated from said position detector, said method comprising the steps of:

comparing either one of said two-phase periodic waves with a predetermined reference value having hysteresis to thereby obtain a roughly estimated position for every a half period of said one periodic wave;

analog-to-digital converting said two-phase periodic waves and a zero-cross value for every sampling period to thereby obtain a finely estimated position; and detecting the position of said moving body on the basis of said roughly estimated position and said finely estimated position while correcting an error due to said hysteresis at the starting point of said roughly estimated position, by use of the relationship between said roughly estimated position and said finely estimated position.

3. A position detecting apparatus comprising:

a moving body;

a position detector for generating two-phase periodic waves having a phase difference of a quarter period corresponding to the position of said moving;

a wave-processing circuit for comparing either one of said two-phase periodic waves obtained from said position detector with a predetermined reference value for every half period of said one periodic wave, and for producing a roughly estimated position output signal upon coincidence between said one periodic wave and said reference value, and for forming two, positive and negative, displacement pulse signals from said two-phase periodic waves for detecting the direction of displacement of said moving body;

a U/D counter for counting up/down said two, positive and negative, displacement pulse signals to thereby detect a roughly estimated position of said moving body for every half period of either one of said two-phase periodic waves;

a finely estimated position circuit for analog-to-digital converting said two-phase periodic waves and a zero value for every sampling period to thereby detect a finely estimated position;

a circumferential absolute position circuit for initializing the U/D counter, for selecting an origin section number and for detecting a circumferential absolute position on the basis of said roughly estimated position and said finely estimated position at an initiation time;

a position correcting circuit for correcting the position on the basis of the output of said U/D counter and said circumferential absolute position;

a roughly estimated position circuit for correcting errors in said roughly estimated position due to the wave-processing by said wave-processing circuit and due to the displacement pulse counting by said U/D counter, on the basis of the output of said U/D counter and the output of said position correcting circuit; and a position synthesis circuit for synthesizing the output of said roughly estimated position circuit and the output of said finely estimated position circuit to thereby detect the position of said moving body.

4. A position detecting method according to claim 1, in which, when said two, positive and negative, displacement pulse signals for detecting the direction of displacement of said moving body are formed from the two-phase periodic waves generated by said position detector, hysteresis is given so that said displacement pulse signals have a predetermined phase lag from the zero value of the finely estimated position signal.

5. A position detecting apparatus according to claim 3, comprising: a U/D counter for counting up/down said two, positive and negative, displacement pulse signals to detect a roughly estimated position of said moving body for every quarter period with respect to the two phases of said two-phase periodic waves, and means for detecting the position of said moving body by analog-to-digital converting the respective phases of the output signals of said two-phase periodic waves and a zero value for every sampling period, by detecting a finely estimated position by use of a finely estimated position circuit and by synthesizing said roughly estimated position and said finely estimated position, whereby errors in said roughly estimated position caused by the wave processing and displacement pulse counting operation as described in claim 1 is corrected.

* * * * *